No. 778,576. PATENTED DEC. 27, 1904.
C. R. GROFF.
MACHINE FOR SEPARATING COFFEE.
APPLICATION FILED JAN. 9, 1903.

Fig. 4.

No. 778,576. PATENTED DEC. 27, 1904.
C. R. GROFF.
MACHINE FOR SEPARATING COFFEE.
APPLICATION FILED JAN. 9, 1903.

Witnesses:
E. M. Boesel.
U. H. Williams.

Inventor:
Charles R. Groff,
by: Stryker & Bradbury
Attorneys.

No. 778,576.

Patented December 27, 1904.

UNITED STATES PATENT OFFICE.

CHARLES R. GROFF, OF ST. PAUL, MINNESOTA.

MACHINE FOR SEPARATING COFFEE.

SPECIFICATION forming part of Letters Patent No. 778,576, dated December 27, 1904.

Application filed January 9, 1903. Serial No. 138,386.

*To all whom it may concern:*

Be it known that I, CHARLES R. GROFF, a citizen of the United States of America, and a resident of St. Paul, in the county of Ramsey and State of Minnesota, have invented certain new and useful Improvements in Machines for Separating Coffee, of which the following is a specification.

My invention relates to improvements in machines for separating coffee and other commodities. Its object as applied to coffee is to separate what is commonly known as the "black" or imperfect beans in green coffee and the white and imperfect beans, commercially known as "Quakers," after the coffee has been roasted. By removing the inferior beans the coffee is improved in quality and increased in value. As applied to other commodities its object is to separate the imperfect and defective from the perfect. By the use of my invention this operation is performed more quickly and with less hand labor and expense.

In the accompanying drawings, forming part of this specification.

In the drawings let A represent the frame upon which the operating parts of this machine are mounted.

B represents the feed-hopper; C, the feed-tray; D, the apron, upon the surface of which the coffee from the hopper is fed by said tray.

E is the receiver for the inferior coffee-beans and imperfections.

F is the exhaust-fan connected with said receiver.

G represents the tubes by which the inferior coffee-beans and imperfections are removed from the apron into said receiver.

H is the clutch mechanism for starting and automatically stopping said apron, and I represents the mechanism by which the moving parts are operated.

Figure 5:
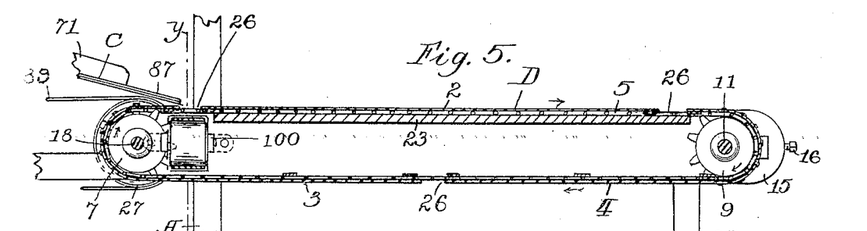
Fig. 5 is a detail longitudinal section of the feed-apron.
Figures 6, 7, 8, 9:
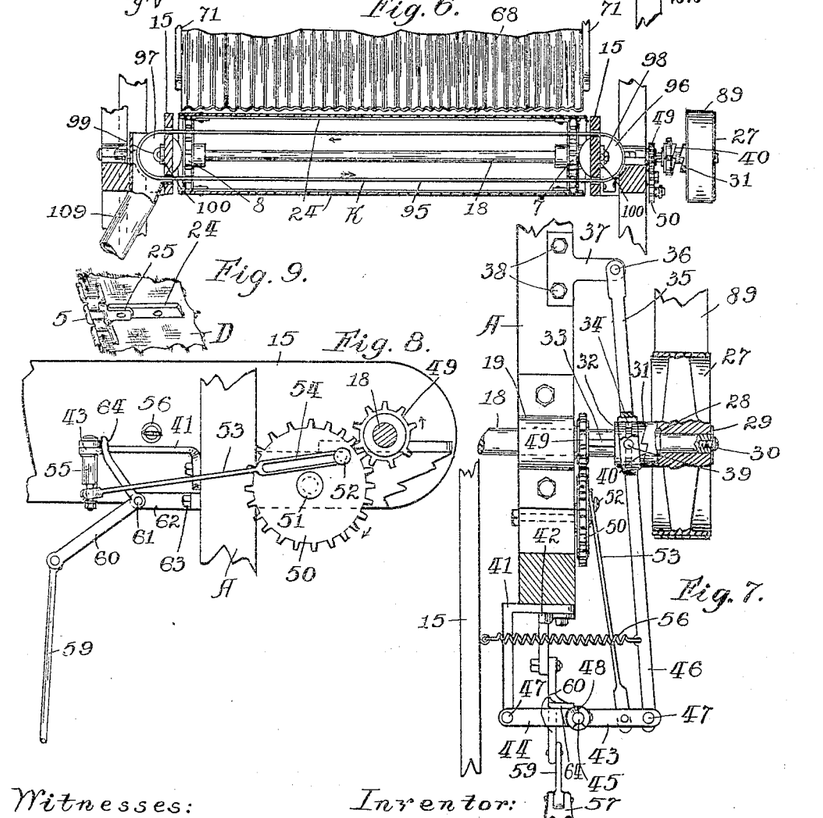
Fig. 6 is a transverse section taken across the line Y Y of Fig. 5.
Fig. 7 is an enlarged view of the clutch mechanism for throwing the feed-apron into and out of operation.
Fig. 8 is another enlarged view of a detail portion of the clutch mechanism.
Fig. 9 is a detail view of the feed-apron, showing means by which the apron is attached to the drive-chains.

The apron D, as shown, is constructed in three sections 2, 3, and 4, which are mounted on the endless chains 5 and 6. These endless chains are operated by means of the sprockets 7, 8, 9, and 10. The sprockets 9 and 10 are mounted on the shaft 11, which revolves in the journals 12. These journals work in the frames 13, which are attached, by means of screws 14, to the sides 15 and are adjusted by means of the bolts 16, which are threaded through the frames 13, and the flanges 17 on the journals 12. The sprockets 7 and 8 are mounted on the shaft 18, which projects through the sides 15 and is journaled at 19 on the frame A. The sides 15 are supported by means of the brackets 20, which are attached to said sides and the frame A by means of screws 21. The outer ends of the sides are provided with supports 22. A table 23 is fastened between the sides for the upper surface of the apron D to travel upon. The sections of the apron are fastened to the cross-rods 24, which in turn are riveted to the flanges 25 on the links of the chains 5 and 6, as shown in Fig. 9. The sections of the apron are positioned on the chains with three transverse openings 26 between, as shown in Fig. 5.

The shaft 18 is adapted to revolve in the direction indicated by the arrows when the clutch mechanism H is operated. A pulley 27 revolves loosely between the shoulders 28 and the washer 29, which is fastened to the end of said shaft by means of the screw 30. The inner end of the hub of the pulley 27 is notched at 31 for engaging the sliding sleeve 32 on said shaft. This sliding sleeve is keyed at 33 to the shaft and grooved at 34. A lever-arm 35 is pivoted at 36 to the bracket 37, which is bolted at 38 to the frame A. A bolt 39 is threaded through said lever and works in the groove 34, so that as the lever is operated the notches 40 on the sleeve 32 are thrown into and out of engagement with the notched hub of the pulley 27, thus causing the shaft 18 to be revolved by said pulley. The angle-iron 41 is fastened to the frame A by means of the bolt 42. A pair of toggle-levers 43 and 44 are pivoted together at 45 and attached between the angle-iron and the operating end 46 of the lever 35 by means of the pivots 47. These toggle-levers are shown in extended position in Fig. 7 and the clutch H closed, so as to revolve the shaft 18 and move the apron D forward. The toggle-levers are stopped by means of the shoulder 48. A gear 49 is mounted on and turns with the shaft 18. This gear meshes with a second gear 50, which is journaled by the bolt 51 on the frame A. The second gear carries a pivot-bolt 52. A trip-arm 53 is slotted at 54, so as to work on said pivot-bolt. The outer end of this rod is loosely connected with the toggle-lever 43 by means of the depending bolt 55. As the shaft 18 revolves the gears turn in the direction of the arrows shown in Fig. 8. The stud-bolt 52 works in the slot 54 and trips the toggle-levers as the gear 50 approaches a complete revolution. A spring 56 is attached beween the side 15 (see Fig. 7) and the operating end 46 of the lever 35. The tendency of this spring is to pull the lever and slide the sleeve 32 out of engagement with the hub of the pulley 27, when the toggle-levers are tripped by means of the arm 53. The clutch and toggle-levers are shown open in Fig. 4.

Figure 4:
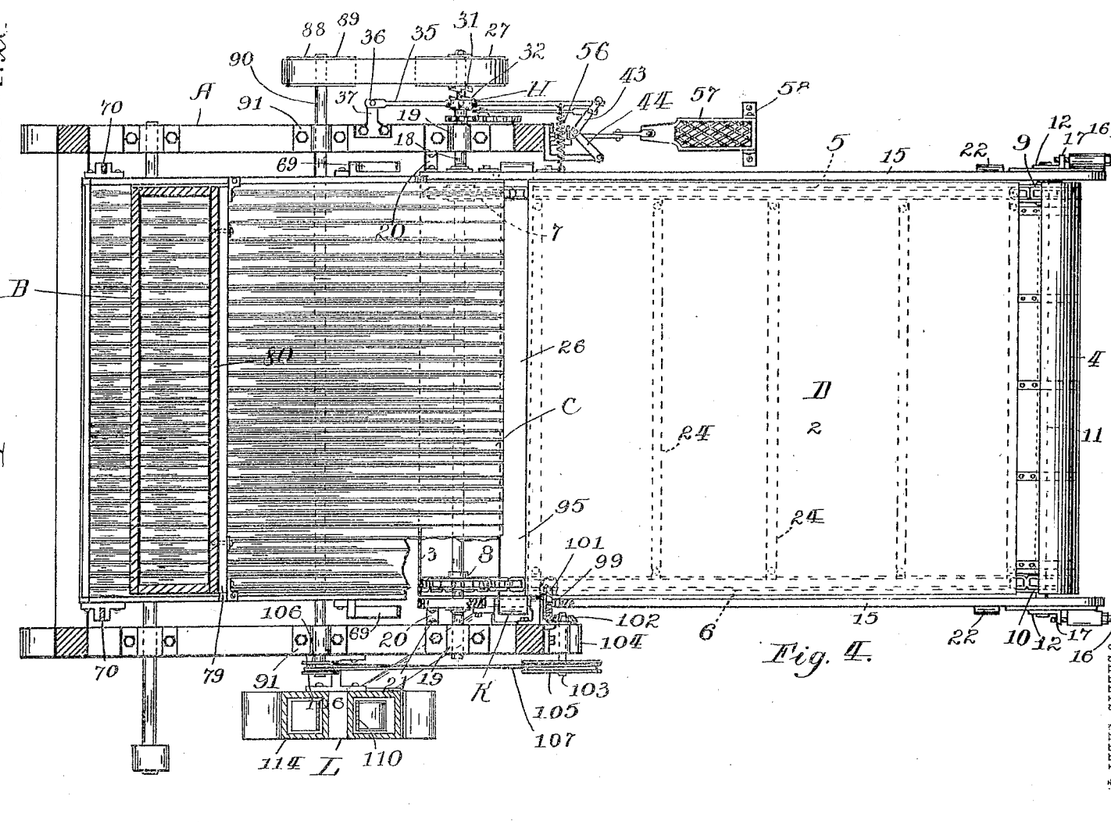
Fig. 4 is a sectional plan view taken on the line X X of Fig. 1.

When the clutch is opened, the apron stops moving. When it is desired to start the apron, the foot-lever 57 is depressed by means of the foot. This foot-lever is pivoted to a floor or other support at 58 and pivotally connected, by means of the connecting-rod 59, with the bell-crank 60. This bell-crank is fulcrumed at 61 on the bracket 62, which is attached to the frame A by means of the bolt 63. The arm 64 of the bell-crank impinges against the toggle-levers, as shown in Figs. 4, 7, and 8, so that as the foot-lever 57 is operated the toggle-levers extend and the clutch-sleeve 32 is drawn into engagement with the pulley 27. The apron then revolves forward until the trip-rod 53 again causes the clutch to be released.

Figure 1:
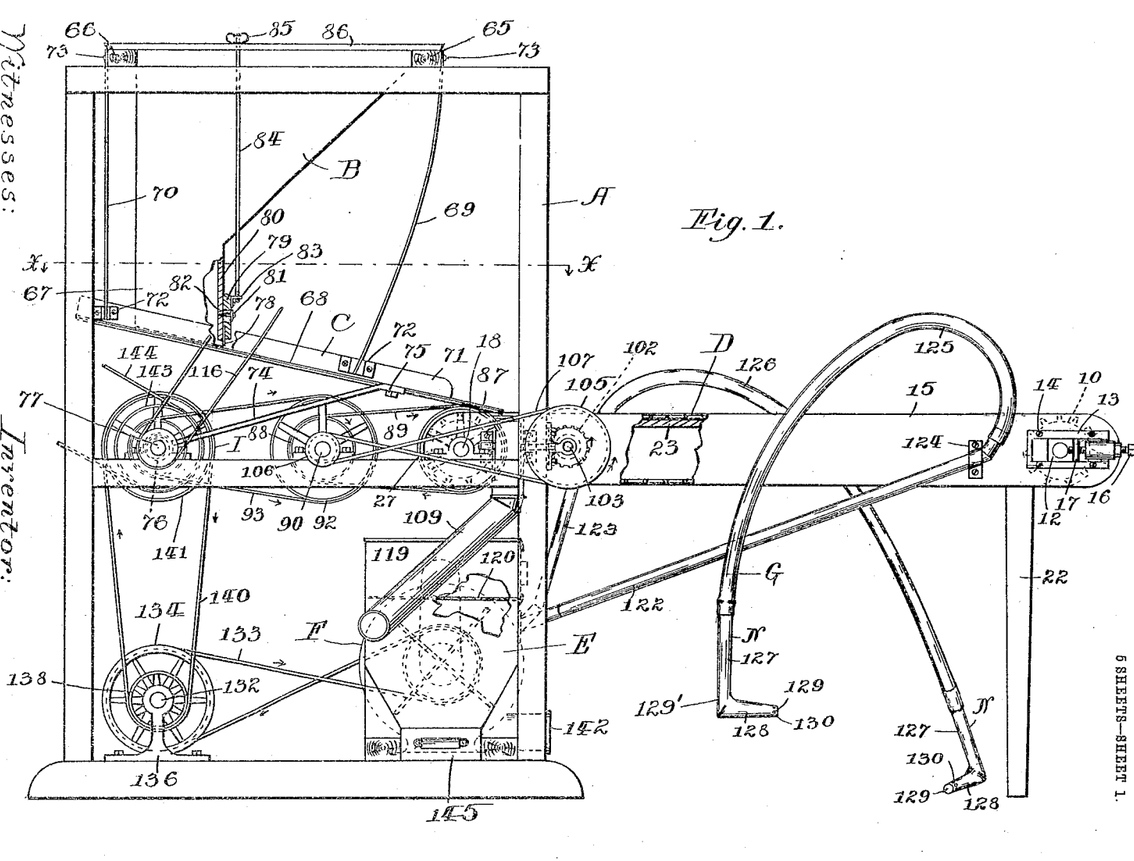
Figure 1 is a side elevation of my improved machine having the elevator removed.

The feed-hopper B is supported on the frame A by means of the cross-bars 65 and 66. The lower portion of the hopper is smaller than the upper portion. The feeder C is inclined from the hopper toward the surface of the apron, as shown in Fig. 1, and adjoins the outlet in the lower end 67 of the hopper. This feeder consists of a corrugated plate 68, the corrugations of which are placed lengthwise in the direction of the movement of the feeder and the apron D. The feeder is swung from the cross-bars 65 and 66 by means of the flexible arms 69 and 70. These flexible arms are attached to the sides 71 of the apron by means of the clips 72 and cross-bars 65 and 66 by means of the screws 73. The feeder is caused to oscillate below the outlet of the hopper by means of the drive-rods 74, which are attached to the feeder by means of the bolts 75 and are eccentrically journaled at 76 on the main drive-shaft 77. The amount of coffee fed from the hopper onto the feeder is regulated by means of the blade 78, which is attached to the plate 79. The plate is fastened to the front 80 of the hopper by means of the screws 81, which work in slots 82. Flanges 83 are fastened on each end of the plate 79, and adjusting screw-rods 84 are threaded in said flanges. The upper ends of these rods have the thumb-pieces 85 and pass through the edges 86 of the hopper. By turning the thumb-pieces the threads on the rods raise or lower the blade 78, so as to vary the opening between said blade and the corrugated tray 68. The lower end 87 of the feed-tray closely adjoins the inner end of the table, so as to feed the coffee to each section of the apron as it passes on the table. The pulley 27 is driven by means of the pulley 88 and belt 89. The pulley 88 is mounted on the shaft 90, which is journaled at 91 on the frame A. This shaft is driven by means of the pulley 92, belt 93, and pulley 94 on the main shaft 77. The feeder C continues to oscillate when the machine is operated, and the position of the pivot 52 on gear 50 and the relative sizes of the gears 49 and 50 are such as to cause each section of the apron D to move forward and stop on the table, leaving each opening 26 in communication with the opening between sections at the inner end of the feeder when the belt stops and while the coffee on the section of the apron on the table 23 is being sorted. When the apron stops, the coffee from the feeder drops through the opening 26 between the sections of the apron onto the conveyer K.

The conveyer K is an endless belt 95, which is arranged transversely between the laps of the apron D and below the opening 26 nearest the inner end of the table when the apron stops, as shown in Figs. 5 and 6. This belt is revolved continuously by means of the pulleys 96 and 97. The shafts 98 and 99 of these pulleys are journaled at 100 on the sides 15 of the table. The shaft 99 carries the bevel-gear 101, which meshes with the bevel-gear 102. The latter gear is mounted on the shaft 103, which is journaled at 104 on the frame A. A pulley 105 is mounted on the shaft 103, and a driving-pulley 106 is mounted on the shaft 90. A belt 107 transmits motion from the driving-pulley 106 to the pulley 105, and thus drives the conveyer K.

Figure 2:
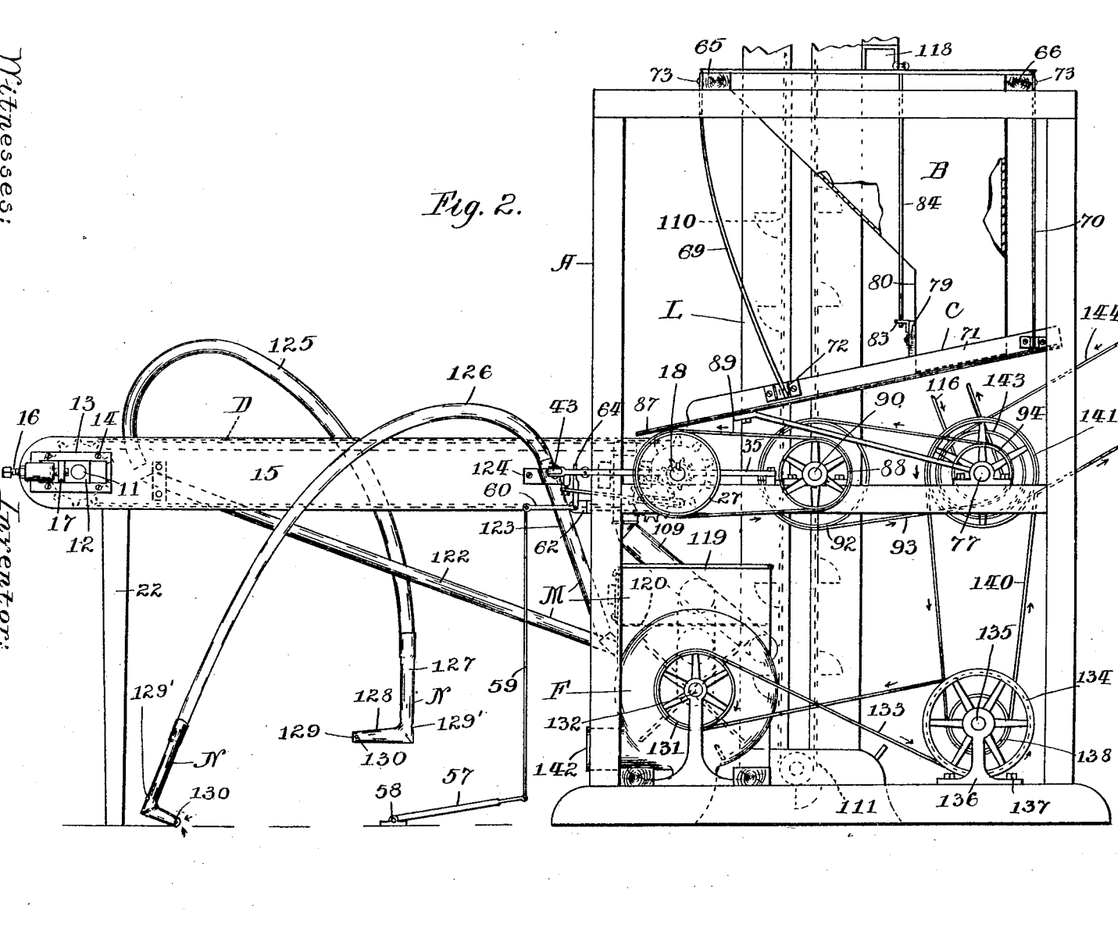
Fig. 2 is a view looking at the other side of the machine and showing the elevator partly broken away.
Figure 3:
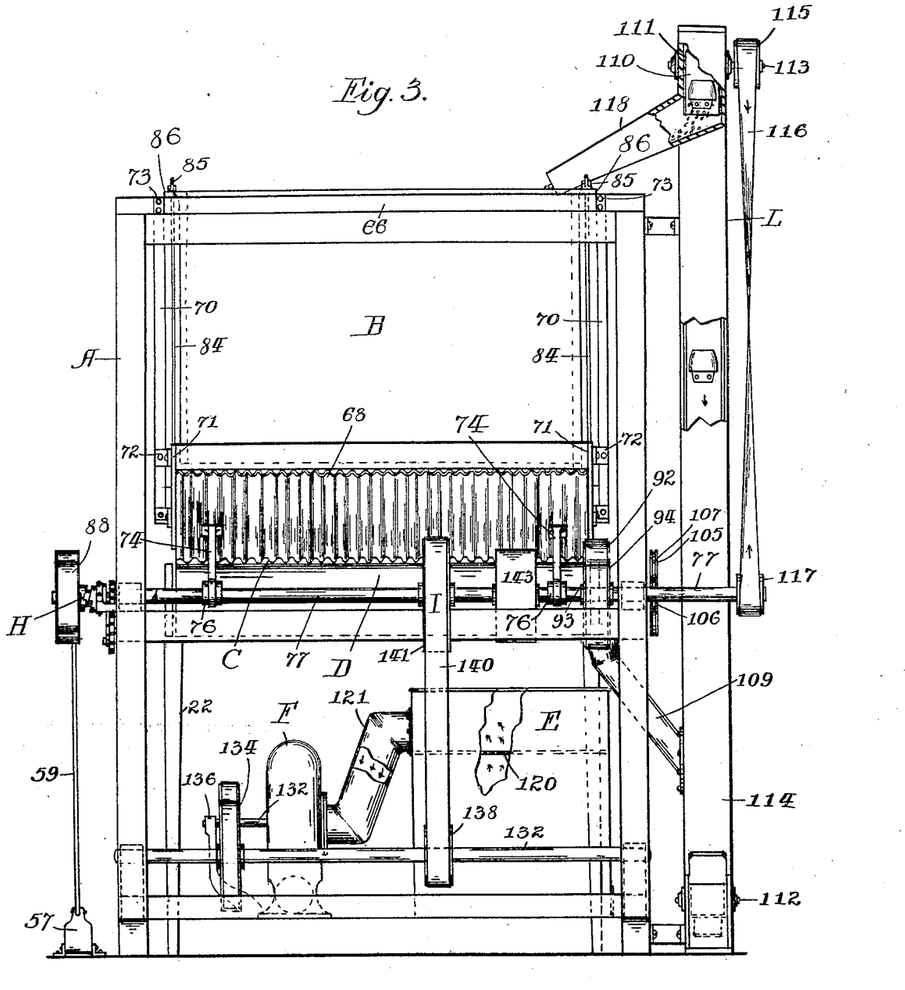
Fig. 3 is an end elevation looking at the back of the machine.

The coffee-beans which drop from the feeder through the opening 26 onto the conveyer K are delivered into the pipe 109. Said pipe is fastened on the frame A and inclines downward into the side of the elevator L. This elevator is of ordinary construction and consists of the endless belt 110, passing around the pulleys 111, which are journaled by means of their shafts 112 and 113 in the inclosing frame 114. The shaft 113 is provided with the pulley 115, which is driven by means of the belt 116, passing over the pulley 117 on the main drive-shaft 77. The elevator-belt travels in the direction of the arrows indicated in Fig. 2, and a spout 118 delivers the coffee from the top of the conveyer back into the hopper B.

The mechanism M for removing and receiving the inferior coffee-beans or imperfections consists as follows: A receptacle 119 is mounted upon the frame A below the apron. A horizontal partition 120, preferably of wire meshing or other suitable perforated material, is placed near the top in said receptacle. An exhaust-fan F is also mounted upon the frame A and has its inlet 121 connected with the receiver above said partition 120. A pair of pipes 122 and 123 connect with the receiver below the perforated partition and are fastened to the sides 15 of the table by means of the clips 124. Flexible tubes 125 and 126, made of rubber or other suitable material, are respectively connected with the pipes 122 and 123, and are provided on their free ends with the intakes N. Each intake is preferably formed with a neck 127, which serves as a handle, and an angular tube 128 on the end of the neck. This angular tube tapers toward its orifice at 129 and has a series of perforations 130 adjoining said opening. The opening 129' acts as a by-passage for the air entering the intake. This by-passage is controlled by the thumb and regulates the force of the air entering the orifice and with the perforations prevents more than a single coffee-bean entering the intake at a time. The exhaust-fan, of ordinary construction, is provided with the drive-pulley 131, which is mounted on its operating-shaft 132. This operating-shaft is connected by means of the drive-belt 133 with a pulley 134 on the counter-shaft 135. The counter-shaft 135 is journaled on the bearings 136, which are fastened by means of the bolts 137 on the frame A. The pulley 138 is mounted on the counter-shaft 135 and driven by means of the belt 140, which passes around the pulley 141 on the main drive-shaft 77. As the main drive-shaft turns in the direction of the arrows the exhaust-fan revolves and air is drawn through the openings 129 in the intakes N and exhausts out of the fan at 142.

In operation the main drive-shaft 77 is driven by means of the main drive-pulley 143 and belt 144 in the direction of the arrows. The feed-apron oscillates continuously. The foot-lever 57 is depressed and the clutch H thrown into engagement with the pulley 27. The apron D then travels in the direction of the arrows shown in Fig. 1. When one of the openings between the sections of the apron registers with the conveyer, the clutch opens automatically and the apron stops traveling. The coffee from the feed-tray then passes onto conveyer K and is returned through the pipe 109, elevator L, and spout 118 into hopper B. By using a corrugated feed-plate 68 and oscillating the feeder C as described the coffee is separated in longitudinal and transverse rows, and each coffee-bean is placed flat side down on the surface of the sections of the apron.

In using the suction-tubes the orifice 129 of the nozzle is placed in close proximity to the bean it is desired to remove. The air passing into the orifice 129 by means of the exhaust-fan with which it is connected draws the beans into the receiver E. The force of the air is regulated by adjusting the thumb over the by-passage 129'. The perforated partition 120 in the receiver prevents the beans passing out of the receiver and through the exhaust at 42. The receiver can be emptied when desired by means of the drawer 145. When the inferior beans and imperfections have been removed from a section of the apron, the foot-lever 57 is depressed and the succeeding section of the apron moves onto the table 23 and receives the coffee-beans to be separated from the feeder C. The beans left on the apron after being separated drop from the end of the apron into a pan or other suitable receptacle (not shown) as the apron travels.

By placing the beans flat side down on the apron it is easier for the operator to detect imperfect beans, and a bean is prevented from tripping away from the edge of the intake and out of reach of the orifice 129 when the intake is used. The operator is thus enabled to use the intake with greater precision and speed for removing the inferior beans and imperfections.

Patents and other publications in many arts—notably, brick-making, ore concentration, and the cleaning of peanuts, coffee, &c.—show that it is necessary to scatter the material out as nearly as practicable in a single thick layer on the picking-table, with the single grains or bodies well separated, so that the refuse may be at once seen and removed by the operatives, and in coffee-screens the berries must be separated one by one to avoid removing good and bad together indiscriminately. This isolation and exposure to view of every separate grain or body is still more necessary when the picking is made far more rapid by the use of mechanical means, such as my pneumatic tube, and this tube must be of a capacity to pick out only single bodies. There is therefore a clear coöperation between such a feed to the apron as will insure the perfect spread or throwing out of the berries and a tube having a capacity too small to receive more than one berry at a time.

It is obvious to those skilled in the art to which this invention relates that this apparatus may be used for sorting beans, peas, and other commodities, and where I have used the word "bean" I mean to include coffee or other beans, pulse or other granular material, and I do not wish to confine myself to the use of this machine for coffee alone, as it is manifest that it may be used for diverse materials.

Having described my invention, what I claim as new, and desire to protect by Letters Patent, is—

1. In an apparatus for cleaning coffee and other commodities, the combination of a carrier-surface, means for evenly scattering the product thereon, and a suction-tube, dirigible at will to any part of the carrier-surface and having a capacity to pick out only single bodies.

2. The combination of a carrier-surface, means for evenly feeding the product thereto and isolating the constituent bodies on said surface, and a suction-tube, dirigible at will to any part of the carrier-surface and adapted to pick out only single bodies.

3. A machine of the class set forth, comprising, in combination, a movable carrier, means for evenly spreading upon the carrier-surface the coffee to be cleaned with the beans flat side down and isolating them, and a flexible suction-tube dirigible at will to any part of the carrier-surface.

4. In a machine of the class set forth, the combination of a hopper, an endless carrier, means for evenly spreading the coffee-beans and isolating them on said carrier, a hand-operable suction-tube adapted to be directed at will to any point of said carrier, means for drawing air up through said tube, means for moving said carrier, and means for throwing said carrier out of operation.

5. A machine of the class set forth, consisting, in combination, of an endless carrier, a hopper above said carrier, a tray inclined from the outlet of said hopper toward said apron for feeding and separating the coffee-beans from each other on said carrier, means for shaking said tray and moving said carrier, a clutch connected with said carrier, means for disengaging said clutch from said carrier, a picking-tube adapted to be directed at will to any point on said carrier, and means for drawing air up through said tube.

6. A machine of the class set forth, consisting of a suitable frame, a feed-hopper mounted on said frame, an apron below the outlet of said hopper, means for evenly spreading the coffee-beans and isolating them on said apron, means for regulating the supply of coffee from the feed-hopper to said feeding and separating mechanism, a suction-tube, a receiver, an exhaust-fan in connection with said suction-tube and receiver, and actuating mechanism for said apron, fan and spreading mechanism.

7. A machine of the class set forth, consisting, in combination, of a movable carrier, a feed-hopper, mechanism between the outlet of said hopper and carrier for evenly spreading and isolating the coffee-beans on said carrier, a hand-operable suction-tube adapted to be directed at will to any point of said carrier, an exhaust-fan and receiver in connection with said tube, and actuating mechanism for said fan, carrier and spreading mechanism.

8. A machine of the class set forth, consisting, in combination, of a hopper, a movable apron, mechanism between said hopper and apron for evenly scattering the coffee-beans on the surface of said apron, means for driving said scattering mechanism and apron, mechanism for throwing said apron out of operation, a hand-operable suction-tube dirigible at will to any part of the surface of said apron and having a capacity to pick out only single bodies, air-exhaust mechanism in connection with said tube, an intake on said suction-tube, and a by-passage-way in said intake.

9. The combination of a carrier-surface, means for evenly scattering the coffee-beans and placing them on their flat sides on the carrier-surface, a hand-operable suction-tube adapted to be directed at will to any point on the carrier-surface, a blower for drawing air up through said tube, and a receiver at the discharge end of the tube.

10. A machine of the class set forth, consisting of a frame, a feed-hopper mounted on said frame, a corrugated feed-tray below the outlet of said hopper, means for oscillating said tray, a carrier below the delivery end of said tray having a transverse passage which registers with said tray when the apron stops, means for moving said carrier in the direction of the movement of said tray, a conveyer adapted to receive the coffee which passes through said passage from the delivery end of said tray when said carrier stops, clutch mechanism in connection with said carrier and the means for moving the same, means for automatically disconnecting said clutch and stopping said carrier when its passage is over said conveyer, a connection for returning the coffee from said conveyer to said hopper, and actuating mechanism for said return connection and conveyer.

11. A machine of the class set forth, consisting, in combination, of a movable apron having a transverse opening, a feed-hopper, mechanism between the outlet of said hopper and said apron for feeding and separating the coffee-beans from each other upon said apron, means for driving said feeding and separating mechanism and apron, clutch mechanism for starting and stopping said apron, and means for returning the coffee passing through said opening to said hopper from said feeding and separating mechanism when the apron is stopped.

12. A machine of the class set forth, consisting, in combination, of a hopper, a carrier having a transverse opening, mechanism between said hopper and carrier for feeding and separating the coffee-beans from each other in a single thickness on said carrier, means for actuating said feeding, and separating mechanism and carrier, means for starting and stopping said carrier, means for returning the coffee-beans passing through said opening from said feeding and separating mechanism to said hopper when said carrier stops, and mechanism for picking the coffee-beans on said carrier.

13. A machine of the class set forth, consisting, in combination, of a frame, a feed-hopper mounted on said frame, a table attached to said frame, an endless apron around said table, a feed-tray, flexible rods by which said tray is hung from said frame below the outlet of said hopper and inclined with its lower end adjoining the upper lap of said apron, a conveyer below the delivery end of said tray, an elevator in connection with said conveyer for returning the product from the conveyer to said hopper, drive mechanism for oscillating said feed-tray continuously and moving said conveyer and apron, means for disconnecting said apron from said drive mechanism, and openings in said apron through which the material passes to the mechanism which returns it to the hopper when the apron is stopped.

14. A machine of the class set forth, consisting of a frame, a hopper mounted and a drive-shaft journaled on said frame, an endless apron, means for feeding the coffee from the hopper on said apron, a conveyer for returning the coffee from the feed mechanism to the hopper, connections with said conveyer, feed mechanism, apron, and drive-shaft, means for stopping said apron while said feed mechanism and conveyer remain in motion, and openings in said apron which are adapted to afford communication between said feed mechanism and said conveyer when said apron stops, a system of suction-tubes, a receiver, an exhaust-fan in connection with said tubes, and a drive connection with said fan and shaft.

15. A machine or the class set forth, consisting, in combination, of a hopper, an endless carrier, mechanism between the outlet of said hopper and said carrier for feeding and spreading the coffee on said carrier, means for operating said feeding and spreading mechanism to move said carrier a predetermined distance and return the coffee from said feeding and spreading mechanism to said hopper when the carrier stops moving, a suction-tube, a receiver connected with said tube, an exhaust-fan connected with said receiver, means for driving said fan, a clutch connected with said carrier and operating mechanism, actuating mechanism for said clutch to stop said carrier, and an opening in said carrier through which the coffee passes to the mechanism which returns it to the hopper when the carrier is stopped.

16. A machine of the class set forth, consisting, in combination, of a hopper, an endless apron, mechanism for feeding and spreading coffee from the hopper on said apron, hand-operable suction-tubes, a receiver and an exhaust-fan connected with said tubes, drive mechanism for said apron, feeding, spreading and fan mechanism, clutch mechanism connected with said apron and drive mechanism, means for disconnecting said clutch mechanism to stop said apron while said other parts are operating, and means for returning the coffee to the hopper from the feeding and spreading mechanism when said clutch is disconnected, said apron being provided with openings which afford communication when the apron is stationary between the feeding and spreading mechanism and said mechanism which returns the coffee to the hopper.

17. A machine of the class set forth, consisting in the combination of a feed-hopper, an endless apron, a horizontal table around which said apron travels, a corrugated feed-tray inclined from the outlet of said hopper to the surface of said apron, eccentric mechanism and connections for oscillating said tray, a transverse conveyer below the upper lap of said apron and the delivery end of said tray, an elevator for returning the product received by said conveyer to said hopper, a suction-tube, a receiver, an exhaust-fan in connection with said tube and receiver, means for driving said feed-tray, apron, conveyer and exhaust-fan, clutch mechanism in connection with said apron and drive mechanism, means for operating said clutch mechanism to stop said apron while the other movable parts are in motion, and openings in said apron to permit the product from the tray to be fed onto said conveyer when the apron is stationary.

18. A machine of the class set forth, consisting, in combination, of a hopper, a movable apron, a swinging, corrugated tray between said hopper and apron, means for oscillating said tray in the direction the apron moves, actuating mechanism for said apron, mechanism for starting and stopping said apron automatically, a dirigible, hand-operable suction-tube adapted to be directed at will to any point of said apron, and air-exhaust mechanism in connection with said tube.

19. A machine of the class set forth, consisting of a hopper, an endless apron, means for evenly scattering the coffee-beans on said apron, all in combination with a dirigible, hand-opearble suction-tube having an intake, a by-passage-way connecting with said tube for regulating the force of the air entering said intake, and a blow-fan and receiver connected with said tube.

20. A machine of the class set forth, consisting of a hopper, an endless carrier having an opening, means between the outlet of said hopper and said carrier for evenly scattering the coffee-beans on said carrier, means for moving said carrier a predetermined distance and said scattering mechanism continuously, means for returning the coffee-beans from the scattering mechanism through said opening when said carrier stops, a dirigible, hand-operable suction-tube adapted to be directed at will to any point on the carrier-surface, and a receiver and fan connected with said tube.

21. A machine of the class set forth, consisting of a hopper, an endless apron, a swinging tray, actuating means for moving said apron and oscillating said tray, a clutch between said actuating means and apron, means for automatically operating said clutch to stop said apron, a conveyer for returning the coffee-beans from the tray to the hopper when the apron stops moving, an opening in said apron, which affords communication between the tray and conveyer, a dirigible, hand-operable suction-tube adapted to be directed at will to any point on the surface of said apron, a suction-fan, a receiver connected with said tube, an intake on the free end of said tube, and a by-passage-way in said intake.

22. A machine of the class set forth, consisting, in combination, of an endless apron, a hopper having an outlet above said apron, a corrugated feed-tray inclined from said outlet toward said apron, means for oscillating said tray and driving said apron to cause the coffee-beans to be evenly scattered on said apron, a clutch connected with said apron and driving means, a suction-tube adapted to be directed at will to any point of the carrying-surface of the apron and having a capacity to pick not more than one coffee-bean at a time, and means for drawing air up through said tube.

23. In an apparatus for cleaning coffee, the combination of a feed-hopper, a horizontal endless apron, a feed-tray inclined from the outlet of said hopper down to the upper lap of said apron, an eccentric connected with said tray for oscillating the same, means for driving said eccentric and oscillating said tray to evenly feed the product and isolate the constituent bodies on said apron, a plurality of suction-tubes, each having a capacity to remove not more than a single bean at a time, and exhaust mechanism connected with said tubes.

24. A machine of the class set forth, consisting, in combination, of a feed-hopper, an endless apron, a feed-tray for feeding the coffee-beans from the hopper and separating them on the surface of the apron, an opening in said apron through which the coffee-beans pass when the apron stops moving, a receiver, a dirigible, hand-operable suction-tube adapted to be directed at will to any point of the carrier-surface and connected with said receiver, a suction-fan in connection with said tube, an elevator adjoining and connected with said hopper, a conveyer in connection with said tray and elevator, to receive from said tray the coffee-beans which pass through said opening when the apron stops moving, a clutch connected with said apron, means for automatically disengaging said clutch from said apron, and actuating mechanism.

In testimony whereof I have signed my name to this specification in the presence of two subscribing witnesses.

CHARLES R. GROFF.

Witnesses:
ELSIE M. BOESEL,
F. G. BRADBURY.